(12) United States Patent
Freedman et al.

(10) Patent No.: US 11,072,464 B2
(45) Date of Patent: Jul. 27, 2021

(54) MULTI-FUNCTIONAL STORAGE CONTAINER AND FITNESS TRAINING SYSTEM

(71) Applicant: GOL-FIT.com LLC, Portland, OR (US)

(72) Inventors: Richard A. Freedman, Vancouver, WA (US); Quincy R. Heard, Portland, OR (US)

(73) Assignee: GOL-FIT.com LLC, Portland, OR (US)

( * ) Notice: Subject to any disclaimer, the term of this patent is extended or adjusted under 35 U.S.C. 154(b) by 1 day.

(21) Appl. No.: 16/369,769

(22) Filed: Mar. 29, 2019

(65) Prior Publication Data

US 2020/0307860 A1 Oct. 1, 2020

Related U.S. Application Data

(60) Provisional application No. 62/918,126, filed on Jan. 16, 2019.

(51) Int. Cl.
| | |
|---|---|
| *B65D 25/20* | (2006.01) |
| *A63B 21/00* | (2006.01) |
| *H02J 7/00* | (2006.01) |
| *F25D 3/08* | (2006.01) |
| *A63B 60/56* | (2015.01) |
| *B65D 6/02* | (2006.01) |
| *A63B 21/018* | (2006.01) |

(52) U.S. Cl.
CPC ........ *B65D 25/20* (2013.01); *A63B 21/00043* (2013.01); *B65D 7/065* (2013.01); *F25D 3/08* (2013.01); *H02J 7/0027* (2013.01); *A63B 21/018* (2013.01); *A63B 21/151* (2013.01); *A63B 60/56* (2015.10); *A63B 2225/682* (2013.01); *A63B 2225/685* (2013.01)

(58) Field of Classification Search
CPC .......... A63B 23/0458; A63B 21/00047; A63B 21/4029; A63B 21/0605; A63B 21/072–075
See application file for complete search history.

(56) References Cited

U.S. PATENT DOCUMENTS

| | | | | |
|---|---|---|---|---|
| 4,319,629 A | * | 3/1982 | Hotta ..................... | A45C 11/20 126/400 |
| 4,410,174 A | * | 10/1983 | Hamada ........... | A63B 21/00047 206/315.1 |
| 5,575,742 A | * | 11/1996 | Wu ..................... | A63B 23/0211 482/142 |

(Continued)

*Primary Examiner* — Nyca T Nguyen
(74) *Attorney, Agent, or Firm* — Charter IP LLC; Matthew J. Lattig

(57) ABSTRACT

In a multi-functional storage container and fitness training system, a storage container of the system includes additional functionality and utility as one or more of a combination of a fitness exercise station, a portable cooler or personal storage container, and a platform to secure smart electronic devices thereon such as smartphones, tablet-like devices, and the like, providing a charging station function to charge these smart devices. The example system may alternatively be understood as a fitness exercise station having multi-functional utility beyond exercise, or a storage container having multi-functional utility beyond the storage of articles.

16 Claims, 14 Drawing Sheets

(56) References Cited

U.S. PATENT DOCUMENTS

| | | | | |
|---|---|---|---|---|
| 5,588,942 A * | 12/1996 | Dillard | | A63B 21/4035 |
| | | | | 482/106 |
| 5,697,870 A * | 12/1997 | Osborn | | A63B 23/0458 |
| | | | | 482/52 |
| 5,830,113 A * | 11/1998 | Goody | | A63B 22/02 |
| | | | | 482/54 |
| 6,245,001 B1 * | 6/2001 | Siaperas | | A63B 21/04 |
| | | | | 482/123 |
| 6,338,702 B1 * | 1/2002 | Jordan | | A63B 21/072 |
| | | | | 294/15 |
| 6,634,998 B2 * | 10/2003 | Siaperas | | A63B 21/04 |
| | | | | 482/123 |
| 6,805,409 B2 * | 10/2004 | Parker | | A47C 9/002 |
| | | | | 297/158.4 |
| 7,803,094 B1 * | 9/2010 | Bolick, Jr. | | A63B 21/1609 |
| | | | | 482/130 |
| 8,403,134 B1 * | 3/2013 | Kantgias | | A63B 71/0036 |
| | | | | 206/315.1 |
| 8,550,243 B2 * | 10/2013 | Moore | | A45C 13/02 |
| | | | | 206/315.1 |
| 8,834,330 B1 * | 9/2014 | Morales | | A63B 23/16 |
| | | | | 482/107 |
| 10,086,895 B1 * | 10/2018 | Melamed | | A45C 5/146 |
| 10,092,791 B2 * | 10/2018 | Donnelly | | B65D 21/0204 |
| 10,272,934 B2 * | 4/2019 | DeFrancia | | B62B 1/12 |
| 10,315,064 B2 * | 6/2019 | Pinkus | | A63B 21/0552 |
| 10,434,355 B1 * | 10/2019 | Kipnis | | A63B 21/00069 |
| 10,576,352 B2 * | 3/2020 | Vester | | A63B 21/4029 |
| 10,625,111 B2 * | 4/2020 | Beaver | | A63B 23/0405 |
| 2003/0168360 A1 * | 9/2003 | Zheng | | B65D 33/02 |
| | | | | 206/216 |
| 2003/0186786 A1 * | 10/2003 | Hsu | | A63B 71/0036 |
| | | | | 482/52 |
| 2004/0035143 A1 * | 2/2004 | Mogil | | A45C 7/0077 |
| | | | | 62/457.2 |
| 2005/0037905 A1 * | 2/2005 | Matos | | A63B 21/4029 |
| | | | | 482/123 |
| 2006/0052220 A1 * | 3/2006 | Jackson | | A63B 21/04 |
| | | | | 482/52 |
| 2007/0087920 A1 * | 4/2007 | Dachraoui | | A63B 21/0552 |
| | | | | 482/123 |
| 2007/0270292 A1 * | 11/2007 | Laney | | A63B 21/4035 |
| | | | | 482/121 |
| 2009/0124464 A1 * | 5/2009 | Kastelic | | A63B 23/0458 |
| | | | | 482/52 |
| 2010/0101973 A1 * | 4/2010 | Kim | | A63B 23/0482 |
| | | | | 206/579 |
| 2010/0167886 A1 * | 7/2010 | Ko | | A63B 21/0552 |
| | | | | 482/123 |
| 2010/0275641 A1 * | 11/2010 | Manner | | A63B 63/08 |
| | | | | 62/457.1 |
| 2011/0173778 A1 * | 7/2011 | Wales | | B25G 1/06 |
| | | | | 16/426 |
| 2013/0034430 A1 * | 2/2013 | Braswell | | F03B 17/061 |
| | | | | 415/182.1 |
| 2013/0040789 A1 * | 2/2013 | Kessler | | A63B 21/072 |
| | | | | 482/108 |
| 2013/0043158 A1 * | 2/2013 | Flood, II | | A63B 55/10 |
| | | | | 206/579 |
| 2013/0127128 A1 * | 5/2013 | Meidl | | B62B 5/085 |
| | | | | 280/47.17 |
| 2013/0143718 A1 * | 6/2013 | Pani | | A63B 21/4035 |
| | | | | 482/8 |
| 2013/0231228 A1 * | 9/2013 | Wyatt | | A63B 23/1209 |
| | | | | 482/130 |
| 2013/0288865 A1 * | 10/2013 | Coulter | | A63B 21/4035 |
| | | | | 482/130 |
| 2013/0319808 A1 * | 12/2013 | McClure | | A45C 5/14 |
| | | | | 190/1 |
| 2014/0014669 A1 * | 1/2014 | Smith | | F25D 31/00 |
| | | | | 220/592.01 |
| 2014/0038731 A1 * | 2/2014 | Manner | | A63B 63/083 |
| | | | | 463/48 |
| 2015/0028568 A1 * | 1/2015 | Tran | | A63B 55/60 |
| | | | | 280/641 |
| 2015/0114024 A1 * | 4/2015 | Grepper | | B01F 7/0025 |
| | | | | 62/320 |
| 2015/0171632 A1 * | 6/2015 | Fry | | H02B 1/26 |
| | | | | 307/22 |
| 2015/0258363 A1 * | 9/2015 | Kampinski | | A63B 21/4037 |
| | | | | 482/139 |
| 2016/0174693 A1 * | 6/2016 | Pompliano | | A45C 11/20 |
| | | | | 224/153 |
| 2017/0065845 A1 * | 3/2017 | Pinkus | | A63B 23/03541 |
| 2017/0080311 A1 * | 3/2017 | Cain | | A47C 7/62 |
| 2017/0082342 A1 * | 3/2017 | Weinberg | | A63B 67/002 |
| 2017/0100622 A1 * | 4/2017 | Wall | | A63B 21/4029 |
| 2017/0197556 A1 * | 7/2017 | Bonenberger | | B62D 21/14 |
| 2017/0246495 A1 * | 8/2017 | Wyncott | | A63B 21/0728 |
| 2017/0280937 A1 * | 10/2017 | Mogil | | A47J 41/0066 |
| 2017/0304695 A1 * | 10/2017 | Murray | | A45C 11/00 |
| 2018/0015938 A1 * | 1/2018 | DeFrancia | | B62B 5/067 |
| 2018/0085623 A1 * | 3/2018 | Flook | | A63B 1/00 |
| 2018/0333603 A1 * | 11/2018 | Peyton | | A63B 21/0602 |
| 2019/0000205 A1 * | 1/2019 | Carden | | B29C 41/04 |
| 2019/0127109 A1 * | 5/2019 | Johnson | | B65D 43/16 |
| 2019/0166993 A1 * | 6/2019 | Siaperas | | A63B 21/4033 |
| 2019/0226742 A1 * | 7/2019 | Poirier | | F25D 3/08 |
| 2019/0344123 A1 * | 11/2019 | Rubin | | A63B 21/0054 |
| 2020/0132362 A1 * | 4/2020 | Ito | | B07C 5/34 |

* cited by examiner

MULTI-FUNCTIONAL STORAGE CONTAINER AND FITNESS TRAINING SYSTEM

CROSS-REFERENCE TO RELATED APPLICATION

The present application claims the benefit under 35 U.S.C. § 119(e) of U.S. Provisional Patent Application Ser. No. 62/918,126 to the inventors, filed Jan. 16, 2019. The entire contents of this provisional application is hereby incorporated by reference herein.

BACKGROUND

Field

The example embodiments in general are directed to a multi-functional storage container and fitness training system, to a fitness exercise station having multi-functional utility beyond exercise, and to a storage container having multi-functional utility beyond the storage of articles.

Related Art

There are literally thousands of portable fitness training devices on the market today, each having varying degrees of utility and portability. Some fitness devices are designed for general fitness or strength training, while others are designed for specific muscle groups or address a singular aspect of training (such as balance training). Many fitness devices are marketed primarily for home use or for use in conjunction with other modalities. Fitness equipment like the TOTAL GYM® utilize body-weight for resistance and thus are designed for general strength and fitness applications in both home consumer and commercial purposes. Namely, a large market segment of fitness products is primarily tailored for heavier commercial use in a gym or fitness center, while other fitness devices have been designed as "light" products for use in hotels, offices, or at the home.

Yet another market segment in the fitness industry includes smaller, compact, in-home products such as the BODY GYM®, a resistance band product designed primarily as a strength building apparatus and fitness system. The BODYBOSS® 2.0 personal gym is another home gym utilizing resistance bands. The SKIL-CARE® EX-Box™ is a system that also uses resistance bands in being marketed particularly toward older adults for range of motion and strength training purposes, and the TRX® suspension training system employs straps to promote resistance.

The similarity in all of these resistance-based fitness devices is that each has a singular purpose, i.e., to exercise through resistance and/or physical exertion. Accordingly, functionality is limited to essentially improving strength, building muscle, or improving cardiovascular fitness, but no additional functions. What is needed is a product that can not only serve as a compact fitness device (portable or fixed), but which includes functionality or additional interrelated components designed for other tasks and purposes having high utility to a user. In addition to its use at home or in a fitness center environment, such a product is easily usable by beginner exercisers, intermediate exercisers, and advanced athletes of all age demographics.

SUMMARY

An example embodiment of the present invention is directed to a multi-functional storage container and fitness training system. The system may include a container having a container body with an interior that is adapted to store contents therein, with multiple exterior side surfaces of the container body including one or more points of attachment for connecting various fitness devices thereto. The system may further include a pivotable lid for securing the contents therein, a top surface of the lid including multiple points of attachment to connect a fitness device thereto. One or more removable handle assemblies may be used with the system, each arranged so as to extend upward from a central area of the lid top surface.

Another example embodiment is directed to a fitness exercise station having multi-functional utility beyond exercise. The exercise station may include a container having an interior adapted to store food, beverage, and personal article items in addition to exercise and weight components therein, with multiple exterior side surfaces of the container including one or more points of attachment for connecting various fitness devices thereto. The station may also include a pivotable lid for securing the contents therein, a top surface of the lid including multiple points of attachment to connect a fitness device thereto, and a rotatable handle configured so as to extend upward from a central area of the lid top surface, the handle enabling a user to lift the container in the course of performing various weight training and endurance exercises. The exercise station may further include a charging port arranged on a surface of the container for charging smart electronic devices in operative electrical communication therewith.

Another example embodiment is directed to a storage container having multi-functional utility beyond the storage of articles. The storage container may include a container body having an interior adapted to receive exercise and weight components therein as well as to store food, beverage, and personal article items, with multiple exterior side surfaces of the container body including one or more points of attachment for connecting various fitness devices thereto. The container may further include a pivotable lid for securing the contents therein, a top surface of the lid including multiple points of attachment to connect a fitness device thereto, and a rotatable handle configured so as to extend upward from a central area of the lid top surface, the handle enabling a user to lift the storage container in the course of performing various weight training and endurance exercises. The exercise station may further include a charging port arranged on a surface of the container body for charging smart electronic devices in operative electrical communication therewith.

BRIEF DESCRIPTION OF THE DRAWINGS

Example embodiments will become more fully understood from the detailed description given herein below and the accompanying drawings, with like elements represented by like reference numerals, which are given by way of illustration only and thus are not limitative of the example embodiments herein.

DETAILED DESCRIPTION

Figure 1:
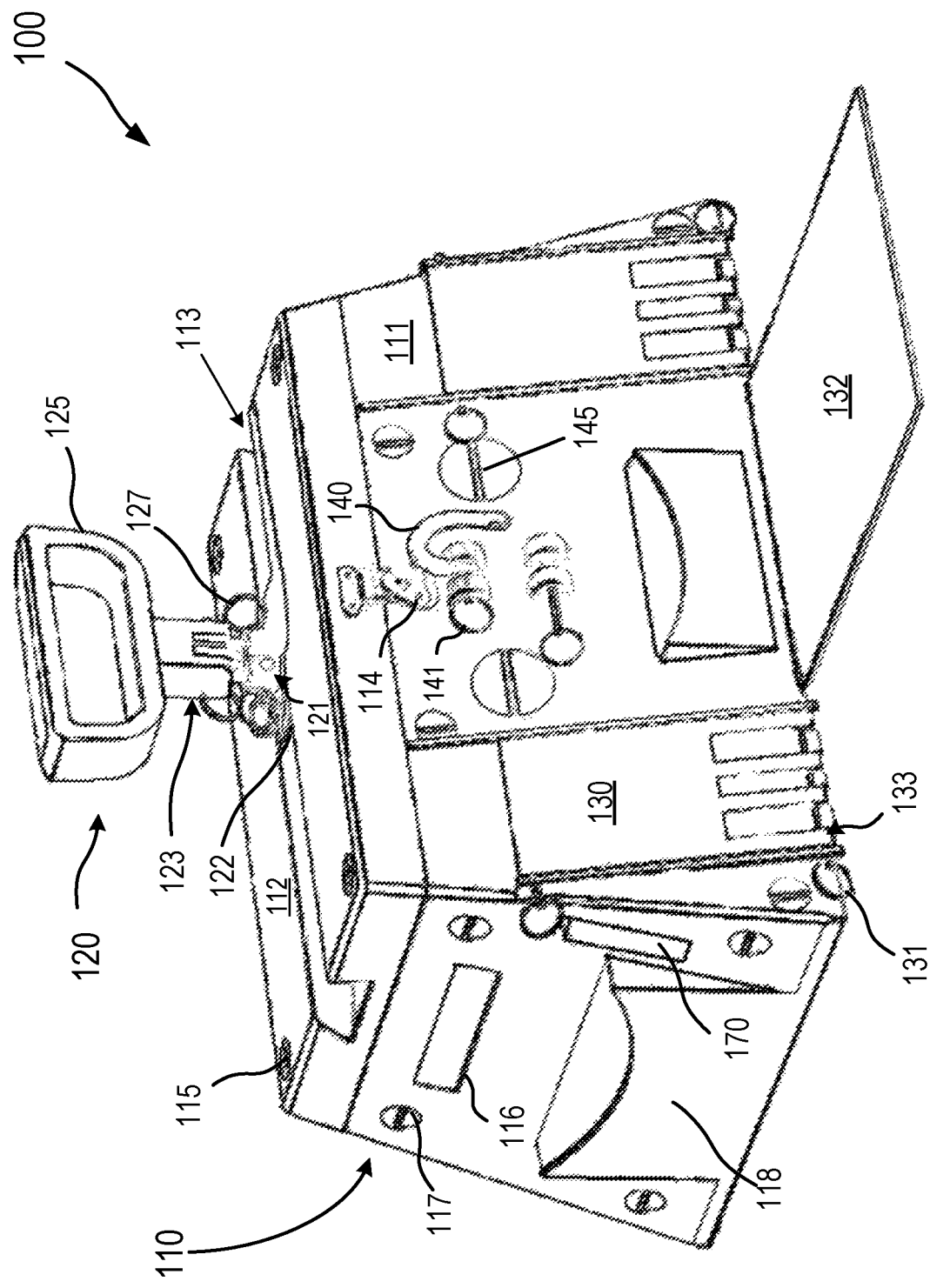
FIG. 1 is a perspective view of a multi-functional storage container and fitness training system according to an example embodiment.
Figure 2:
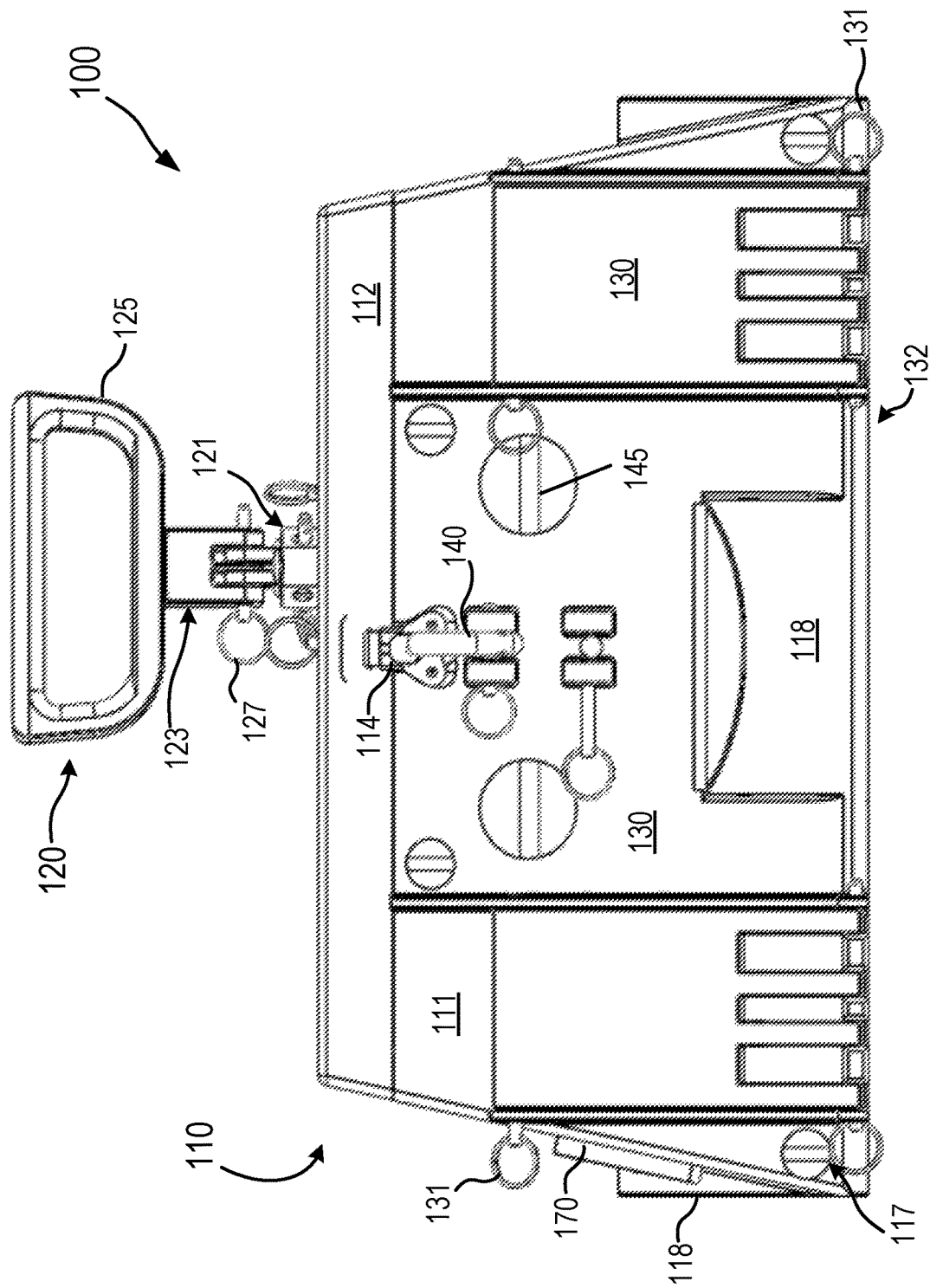
FIG. 2 is a front elevational view of the system of FIG. 1.

As will be shown and described in more detail below, the example embodiments are relevant in the field of exercise equipment, fitness systems, and methods thereof, as well in the field of article storage systems. More particularly, the example embodiments introduce a multi-functional storage container and fitness training system, a fitness exercise station having multi-functional utility beyond exercise, and a storage container having multi-functional utility beyond the storage of articles. Each of the system, fitness station, and storage container include additional functionality and utility as one or more of a combination of a fitness exercise station, a portable cooler or personal storage container, and a platform to secure smart electronic devices thereon such as smartphones, tablet-like devices, and the like, providing a charging station function to charge these smart devices.

In the following description, certain specific details are set forth in order to provide a thorough understanding of one or more example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to." Additionally, reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise. Additionally, and as used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

As to be shown and described in more detail below, the system in accordance with the example embodiments may include a storage container or storage device which in an example may be in the form of a trapezoidal-shaped storage container, although other shapes are contemplated herein. The housing of this container may be designed not only to serve as a complete fitness platform or workstation, but also as a multi-purpose storage container having an interior designed for storage of a user's personal articles. In another aspect, the container may be embodied as an insulated cooler with food, beverage, and ice storage capabilities. Additionally, the container of the system, with personal items or beverages, ice and/or food items stowed therein, may offer an ancillary benefit as a platform containing additional weight to use for stability as an anchor for the exerciser, or otherwise as a platform for adding additional weight to provide stability against a user's pulling or pushing actions during exercise training.

Each of the example system, storage container, and fitness station may further include one or more multi-functional, fixed and or removable handle(s), at least one of which is extendible in a telescoping fashion to enable transport of the system, storage container, or fitness station. Any of the system, storage container or fitness station may additionally include retractable wheels for transport, as well as the aforementioned means for securing smart electronic devices thereon and to charge these devices.

Each of the example multi-functional system, storage container, and fitness station includes a container body and lid having numerous points of attachment for connection of various fitness devices thereto, one example being points of attachment for use with varying exercise resistance bands to apply force for strength training and stretching. These attachment points include other posts, anchors, hooks, or other means for attaching a variety of strength training and endurance devices, including but not limited to the aforementioned resistance bands, fitness ropes, a weight bar for use in "landmine" exercises, and a boxing heavy punching bag for boxing or martial arts-type movements and repetitions.

Each of the example multi-functional system, storage container, and fitness station thus is configured to provide a compact, portable and stable platform for complete fitness training of the entire body, for virtually all ages and fitness levels. The container interior offers varied utility as to the storage or stowage of personal items, adding stabilization weight, or as a cooler for storing ice, food, and beverages. Each of the example multi-functional system, storage container, and fitness station may also include one or more different and removable handles to enable lifting (for strength training purposes) as well as for movement and transport thereof via recessed wheels on an underside thereof. Further, a handle may be configured with a holder function to support a smart electronic device thereon, with the system providing a further ability to charge these devices electronically.

The example embodiments hereafter describe a multi-functional storage container and fitness training system ("system 100"), which in one aspect may also be referred to or understood as a fitness exercise station or workstation providing options for performing various fitness training regimens, but having multi-functional utility beyond exercise. In another aspect, system 100 may be referred to or understood as a storage container having multi-functional utility beyond the storage of articles.

Referring to FIGS. 1-12, system 100 may include a storage container 110 comprising at least a container body 111 with an articulating or pivotable cover or lid 112 attached thereto via rear hinge 119. In an example, the interior of the container body 111 may be insulated. System 100 includes a removable handle assembly 120 attachable within a grooved channel 113 formed across a top surface of lid 112. The lid 112 may be securable to container body 111 to secure contents within an interior 129 thereof via a lock mechanism 114.

Figure 11:
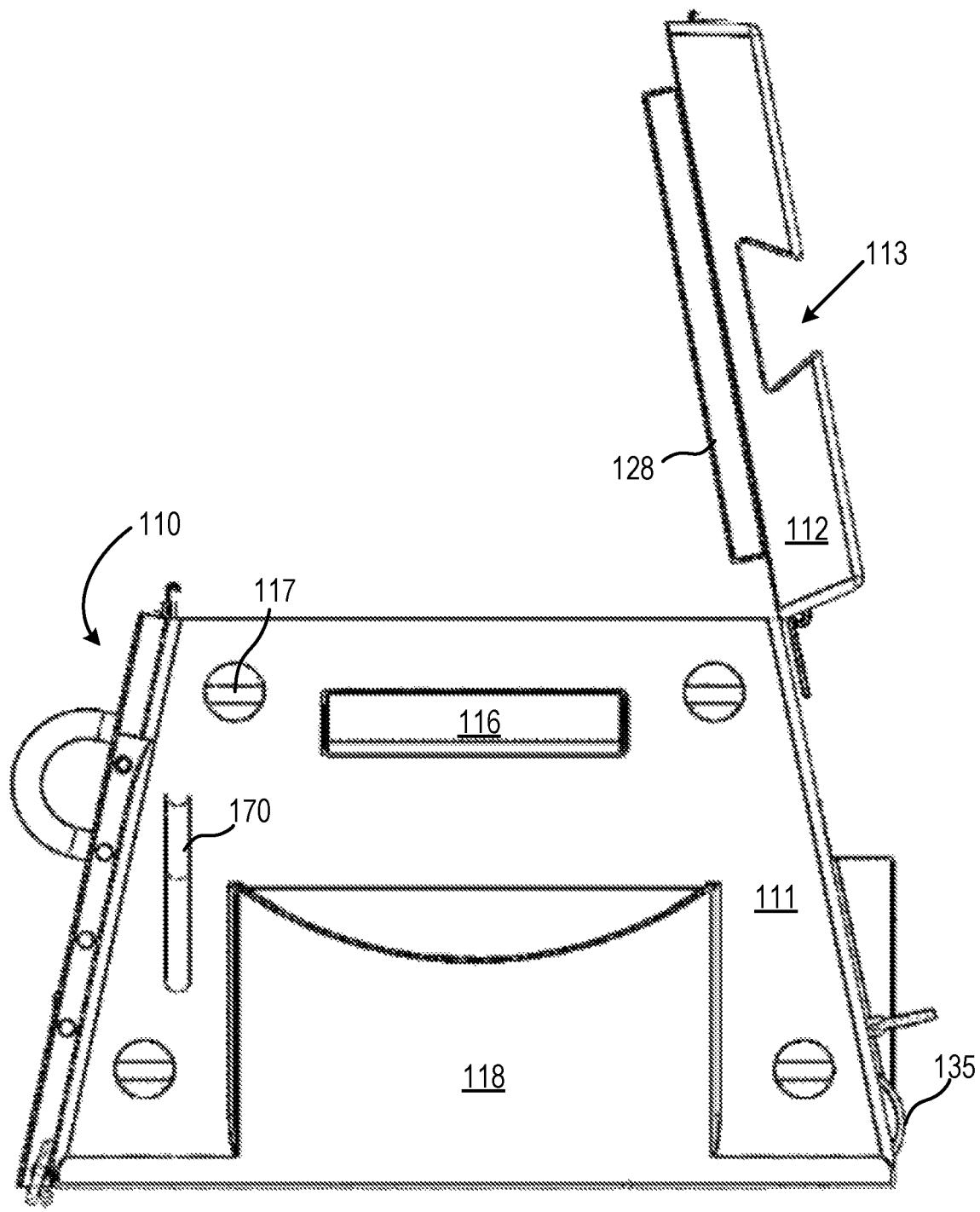
FIG. 11 is a right-side elevational view of the system of FIG. 1 with the lid open.
Figure 12:
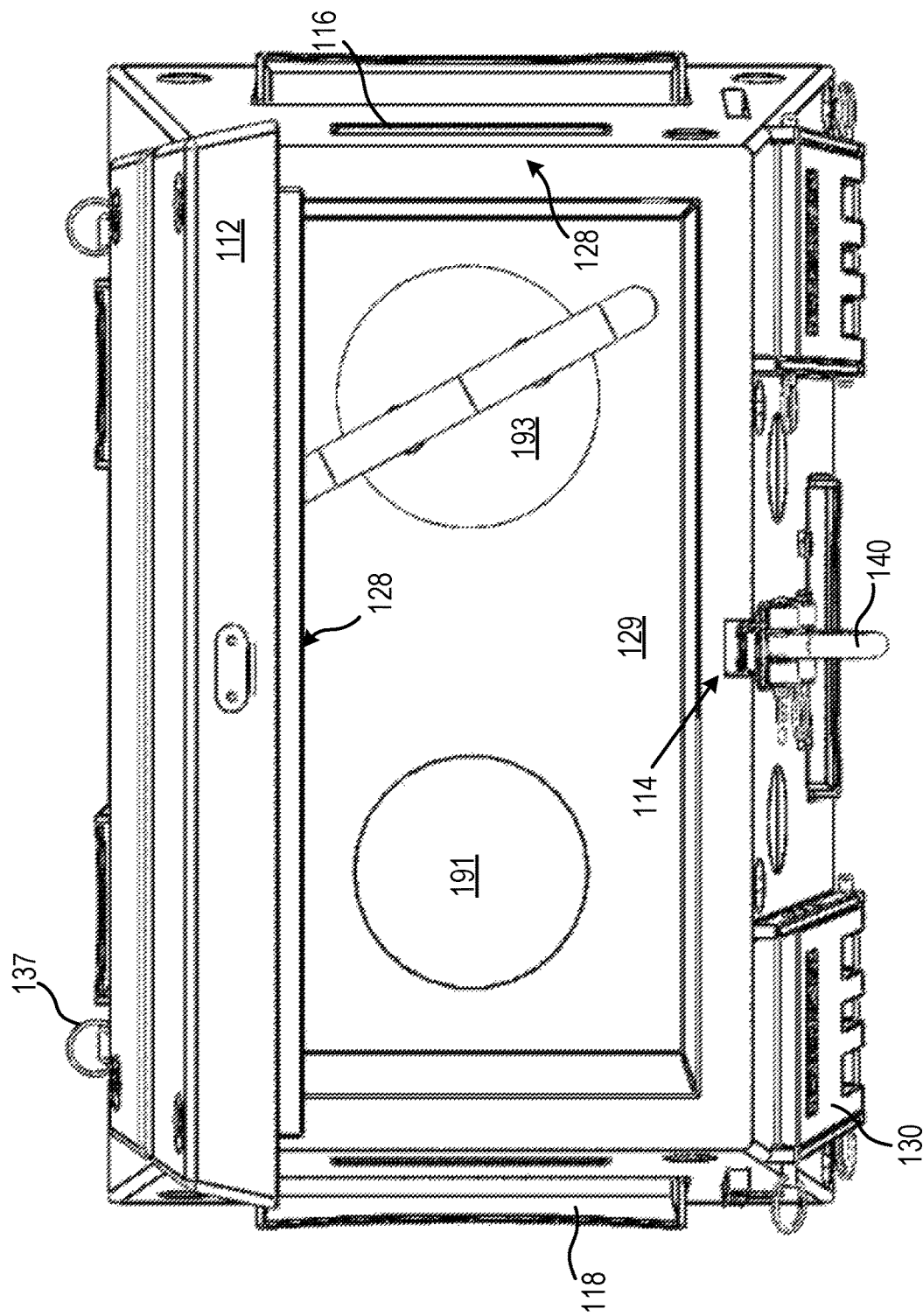
FIG. 12 is a top plan view of the system as shown in FIG. 1 to illustrate insulation in the interior and placement of weights or other objects therein

Namely, the lock 114 permits system 100 to securely store (within the interior 129 of storage container 110) a wide range of materials or items such as ice, beverages, weights for additional stabilization, added weight for lifting the container 110 as in weight training, or personal items. Thus, in various use configurations for exercise, the interior 129 and sleeves 118 may be filled with one or more of weights, ice, beverages, food items, personal items, and the like to add weight to the system 100 so as to provide a leveraging moment against the user during exercise. As best shown in FIGS. 11 and 12, an underside surface of lid 112 as well as the side and bottom surfaces within the interior 129 of container body 111 may be insulated with an insulating material 128. Suitable insulating materials 128 that trap air include but are not limited to polystyrene or polyurethane foam, wool, glass wool, composites thereof, and the like. Accordingly, the storage container 110 in one instantiation could serve as a cooler for ice, beverages or the like, and/or as a storage unit for additional weight to the system 100 and/or for storage of personal items.

As shown in FIG. 12 with the lid 112 removed, the interior 129 of the storage container 110 offers an option to store kettlebells 193 or other weighted objects in a cavity 191 provided therein, for the purpose of stabilizing system 100 while in use and/or to provide additional weight for a variety of strength and endurance exercises in which a user can lift the system 100, pull or push on system 100, or provide a required weight for an optional boxing bag attachment.

With the handle assembly 120 removed, a user may perform numerous lower body strength and plyometric exercises to train concentric and eccentric movements. These exercises may include but are not limited to one or more of calf raises, step-ups, box jumps, jump-overs, rotational jumps, reaction jumps and other jump variations. Lid 112 contains four threaded inserts 115 at corners thereof. These provide locations where detachable rods can be screwed into the lid 112, and a boxing heavy bag of varying weights can be inserted over the rods in a sleeve-like fashion so the user can perform boxing movements and/or martial arts punches and kicks. System 100 in this configuration would be weighted on the interior 129 and/or in the exterior sleeves 118 to stabilize container 110 so as to prevent movement or sliding thereof while in use.

The storage container 110 further includes components and functionality to both provide a means to hold personal smart electronic devices (examples being smartphones, tablets, PDAs and the like) and to serve as a charging station for these smart electronic devices. Namely, container body 111 may be provided with one or more USB or electrical ports 170 for connecting a smartphone 180 or tablet (smart electronic devices) with an encased charging storage battery (not shown) to charge those devices. The USB/electronic port 170 and therefore system 100 thus provides additional functionality beyond exercise or storage by serving as a charger. As is known, charge cables may be connected between smart electronic devices and the USB/electronic port 170. It is contemplated that system 100 may further include BLUETOOTH technology in the form of a wireless transceiver embedded or otherwise attached to container 110 to enable wireless charging when linked/connected wirelessly to one or more smart electronic devices.

The container 110 in this example has a generally trapezoidal shape although not so limited; various other shapes are contemplated herein. For example, the container body 111 could be formed into any of circular, cuboid, polygonal, or other geometric shape. The size of system 100 may be made to scale as desired, depending on the required use or market. As one example, the footprint of system 100 could be modeled based on a small cooler to serve as a carry-on, so as to comply with airline regulations. With customization, container 110 could be shaped and molded so as to be stackable and/or connectable in a modular fashion whereby several modules could be aligned and/or connected together to serve multiple users at a fitness facility, so as to conduct circuit training.

Container body 111 further may include a plurality of attachment points for connection of various exercise or fitness devices thereto. These attachment points in one example may be embodied as a plurality of recessed eyelets 117 as well as one or more recessed posts 145 formed on or in various surfaces of body 111 thereof. These eyelets 117 and posts 145 may be used as an attachment point for resistance bands, ropes, and the like. In an example, posts 145 may serve a purpose similar to that of the recessed eyelets 117, but also allow for supplemental exercises or to serve as alternate points for securing system 100 in place to prevent movement.

The series of recessed eyelets 117 and posts 145 positioned on all sides of the container body 111 enable attachment of various types of stretchable, resistance bands of varying lengths and resistances to perform a multitude of exercises. System 100 thus enables a user to adjust resistance levels from between those suitable for beginners to those levels which challenge advanced users. With multiple eyelets 117 available on all sides, tri-planar training can occur at varying angles and positions, facilitating strength training on the coronal, transverse, and sagittal planes for full body workouts. By using all four sides of the container 110, up to four individuals may use system 100 simultaneously when configured in a resistance band mode.

Additionally in this example, the front surface of container body 111 (or on a side surface or a rear side thereof), may be provided with an attachment point in the form of a removable hook or D-ring 140 attachable thereto via release pins 141 for attaching a fitness rope thereto. Further, one or more pocket sleeves 118 may be provided on exterior surfaces of container body 111. These external or exterior sleeves 118 may be adapted to retain additional weights or small personal items of the user.

The semi-circular D-ring or hook 140 may be positioned in order to attach a fitness rope, occasionally referred to as a "battle rope", for use in endurance training. The battle rope may be secured to container body 111 by rotating the hook 140 downward and over the battle rope and securing it with hitch pins 141. With this function, container 110 should be weighted to provide a counter leveraging moment to tension imparted on the battle rope by a user. This may be done by placing weights within the interior 129 and/or in the exterior sleeves 118, so as to prevent sliding movement of system 100 when in use. This feature enables one to experience another type of full body workout. The workout is typically done at varying intensities to burn calories and improve endurance in a low-impact fashion.

Figure 3:
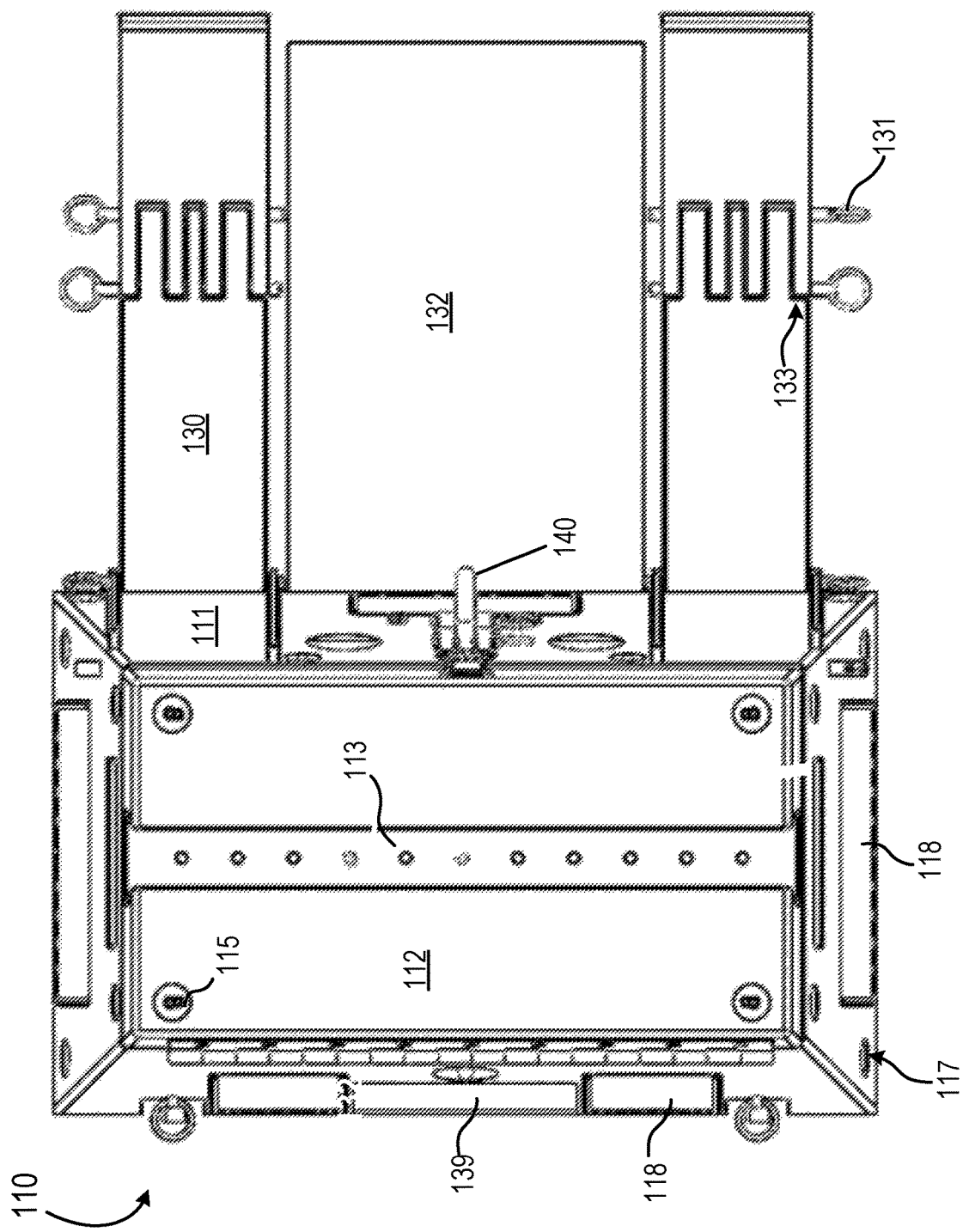
FIG. 3 is a top plan view of the system of FIG. 1 with the handle assembly removed.
Figure 4:
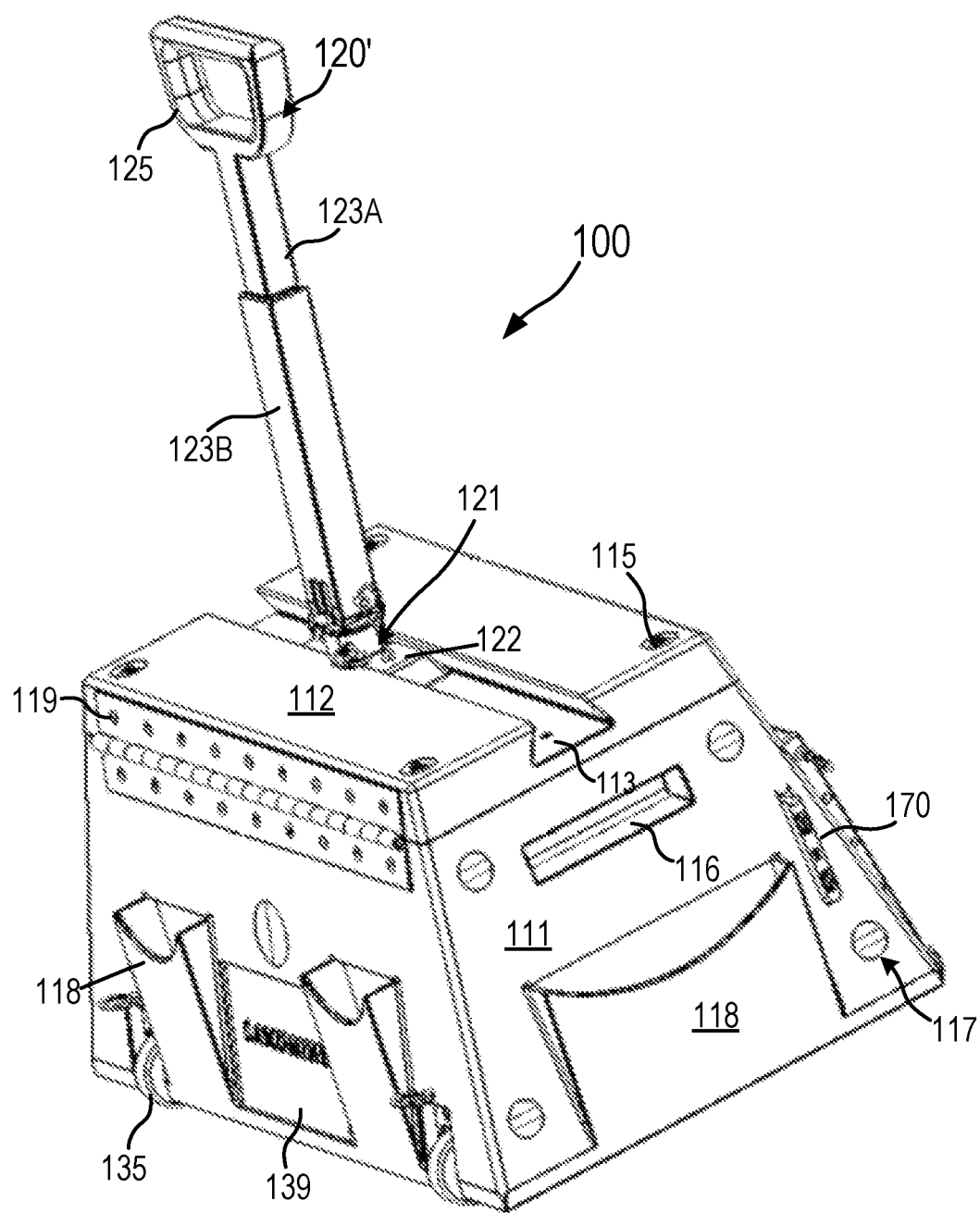
FIG. 4 is a rear perspective view of the system of FIG. 1 with the handle assembly in an extended state.

The handle assembly 120 is provided for transport of the system 100 via a set of wheels 135 and in one example may be a removable, fixed length assembly 120 or a removable telescoping assembly 120' as shown in FIG. 4. In this example, and in addition to the removable handle assembly 120, container body 111 may include one or more recessed side handles 116 formed in surfaces thereof, or as a pair of side recessed handles 116a and a front and rear (rear not shown) recessed handle 116B formed therein, as shown in the example construction of container 110 in FIG. 9. In a first aspect, fixed handle assembly 120 includes a base 121 that is secured to a trolley 122 that rides back and forth within the grooved channel 113 formed in the top surface of lid 112. A stem 123 connects the base 122 to a rotatable handle 125, with the handle 125 rotatable on stem 123 and collectively detachable from the base 121 (and the base 121 detachable from trolley 122) by removing suitable fasteners such as quick release pins 127. In a second aspect, there is shown a telescoping handle assembly 120' substantially identical to that shown in FIGS. 1-3, with the exception that the stem 123 is configured as an upper telescoping member 123A slidable vertically within the larger diameter lower fixed member 123B.

The handle assembly 120/120' may be inserted or removed via the grooved channel 113; upon insertion the handle assembly 120/120' may slide via trolley 122 and be secured in varying positions along the lid 112 using a series of fasteners (quick release or hitch pins 127) to lock the handle assembly 120/120' in place. The handle 125 is rotationally adjustable by a user to enable the user to lift the container in the course of performing a variety of weight training/endurance exercises. These exercises might include one or more of upright rows, deadlifts, squats, etc.

FIG. 3 shows a configuration with the handle assembly 120/120' removed. This arrangement lends itself to other exercise possibilities not readily apparent, such as plyometric exercises, i.e., exercises where a user exerts maximum force in very short intervals of time. An example of a plyometric movement is the act of performing up and down "box jumping" repetitions using the lid 112 as the top surface. Lower body strength training exercises such as step-ups can be done by stepping up and down on the lid 112. Angled push-ups can be done by leaning upward or downward by holding on to the lid 112 or by placing the feet on the lid 112 while in push-up position. In addition, one can jump over the container 110 (sans handle) in rapid succession for aerobic activity and/or plyometric purposes. These options facilitate the meeting of a wide range of fitness objectives, while creating an environment of unprecedented flexibility for training.

Figure 7:
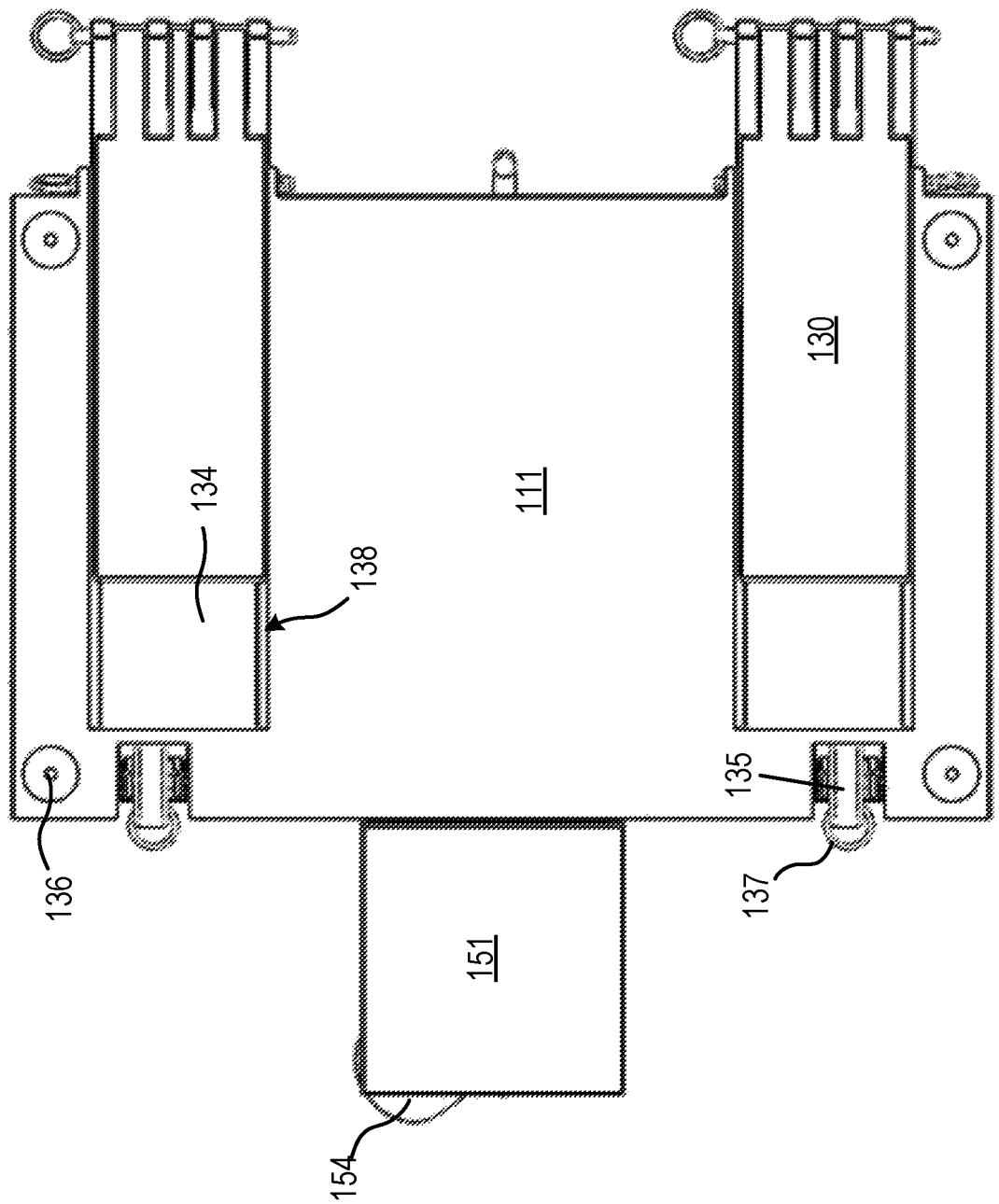
FIG. 7 is a bottom plan view of the system of FIG. 1 with the sleeve assembly of FIG. 5 attached in a deployed state.

System 100 may additionally include a pair of articulating footplates 130 and a central stabilization plate 132 for system 100 stabilization on a floor or other planar surface during exercise. Footplates 130 may be hinged (see hinge 133) and in one example of a stowed configuration, may fold up at hinge 133 to be retained onto the front surface of storage container 110 via suitable fasteners such as quick release pins 131. In another example embodiment, the container 110 may include a pair of recessed channels 134 formed into an underside of the container body 111, such as is shown in FIG. 7. Here, the footplates 130 slide back and forth within channel 134 and may be retained via frictional contact between slot channels 138, so as to be slid inward to a stowed configuration, or pulled outward to achieve a deployed configuration on container 110.

Figure 8:
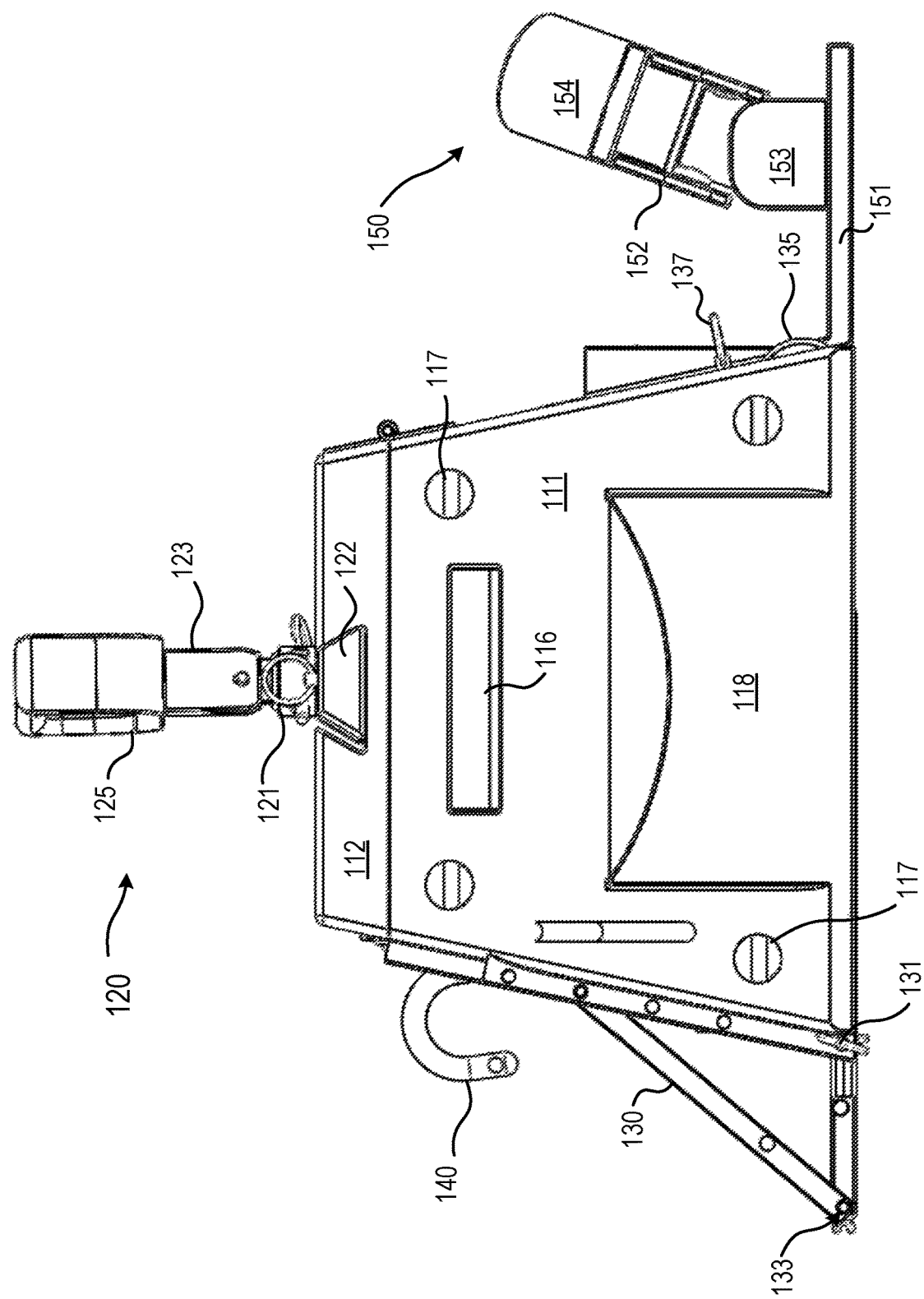
FIG. 8 is a right-side elevational view of the system of FIG. 1 with each of the sleeve assembly and the foot plates in a deployed state.
Figure 9:
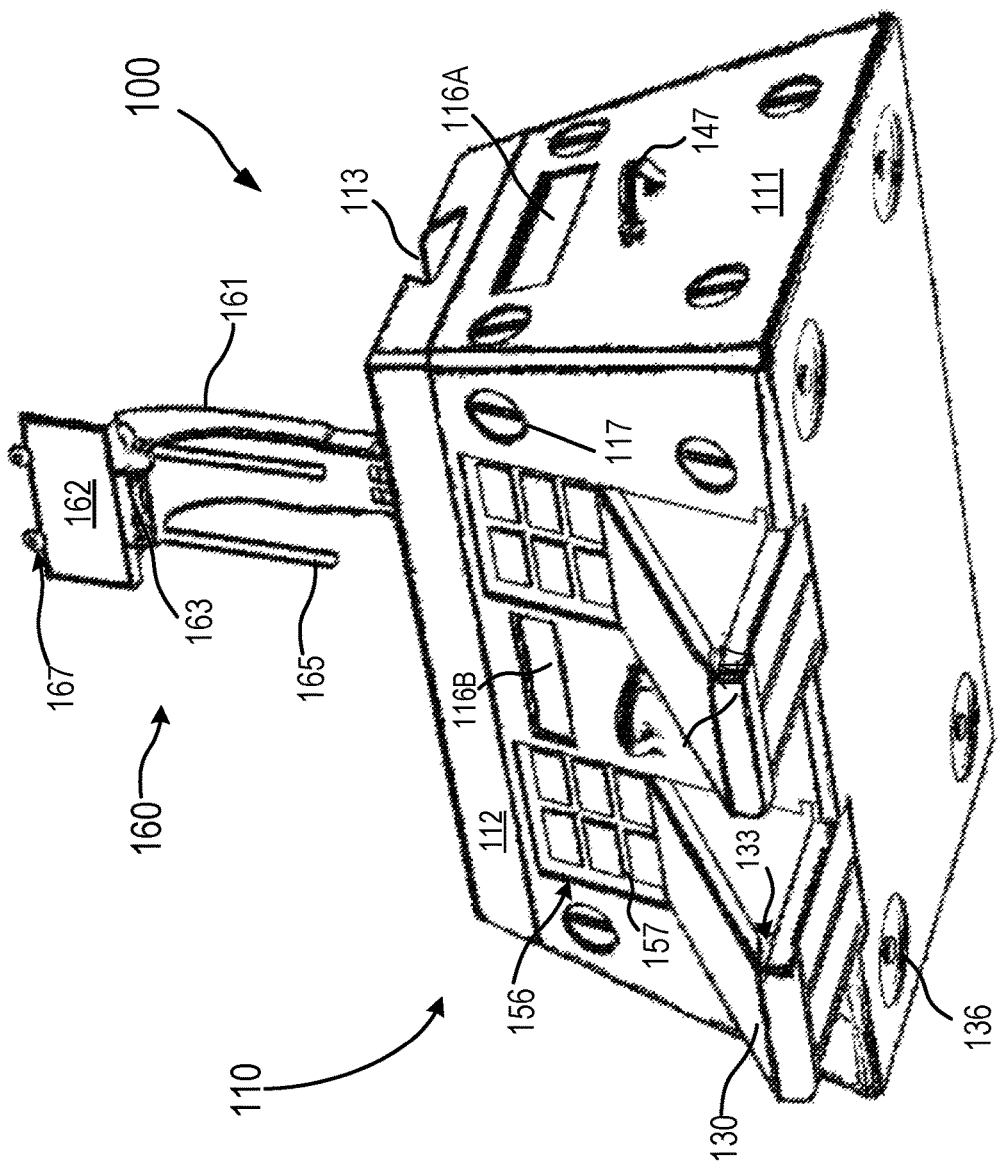
FIG. 9 is a perspective view of the multi-functional storage container and fitness training system with a container body and another example handle assembly for securing smart electronic devices according to another example embodiment.

Referring to FIGS. 3, 8, and 9, the footplates 130 may be articulated at hinge 133 and secured to the container body 111 in a deployed configuration also by using release pins 131. As best shown in FIGS. 3 and 8, the two front footplates 130 as well as a retractable center stabilization plate 132 are configured so as to be oriented in a fully deployed position to enable stabilization of system 100 during use.

In another example construction of container 110 as shown in FIG. 9, a recessed panel 156 of slot channels 157 may serve as a footplate 130 holder, permitting for adjustment in the angle of articulation of the upper or forward hinged portion of footplate 130 relative to the container body 111 front surface, when the footplates 130 are arranged in a deployed configuration. Here, a seated user can stabilize the container 110 of system 100 by stepping on the footplates 130, with the footplates deployed at any of several adjustable angles.

Thus, the two retractable footplates 130 can be deployed in order for the user to perform various exercises in a seated position on the floor or mat, or in a seated position in a chair or bench. The footplates 130 can be positioned at varying angles (as shown in FIG. 9) to accommodate individuals of different heights and/or leg lengths. For those exercises performed in a standing position, system 100 may be stabilized in two fashions: (a) the user can stand on a retractable footplate 130 located on the lower front of the container 110 using one's bodyweight; or (b) weights 193, such a kettle bells, dumbbells, or similar objects, can be added to the interior 129 of the container body 111 or in the external sleeves 118 provided on one or more sides thereof.

Figure 5:
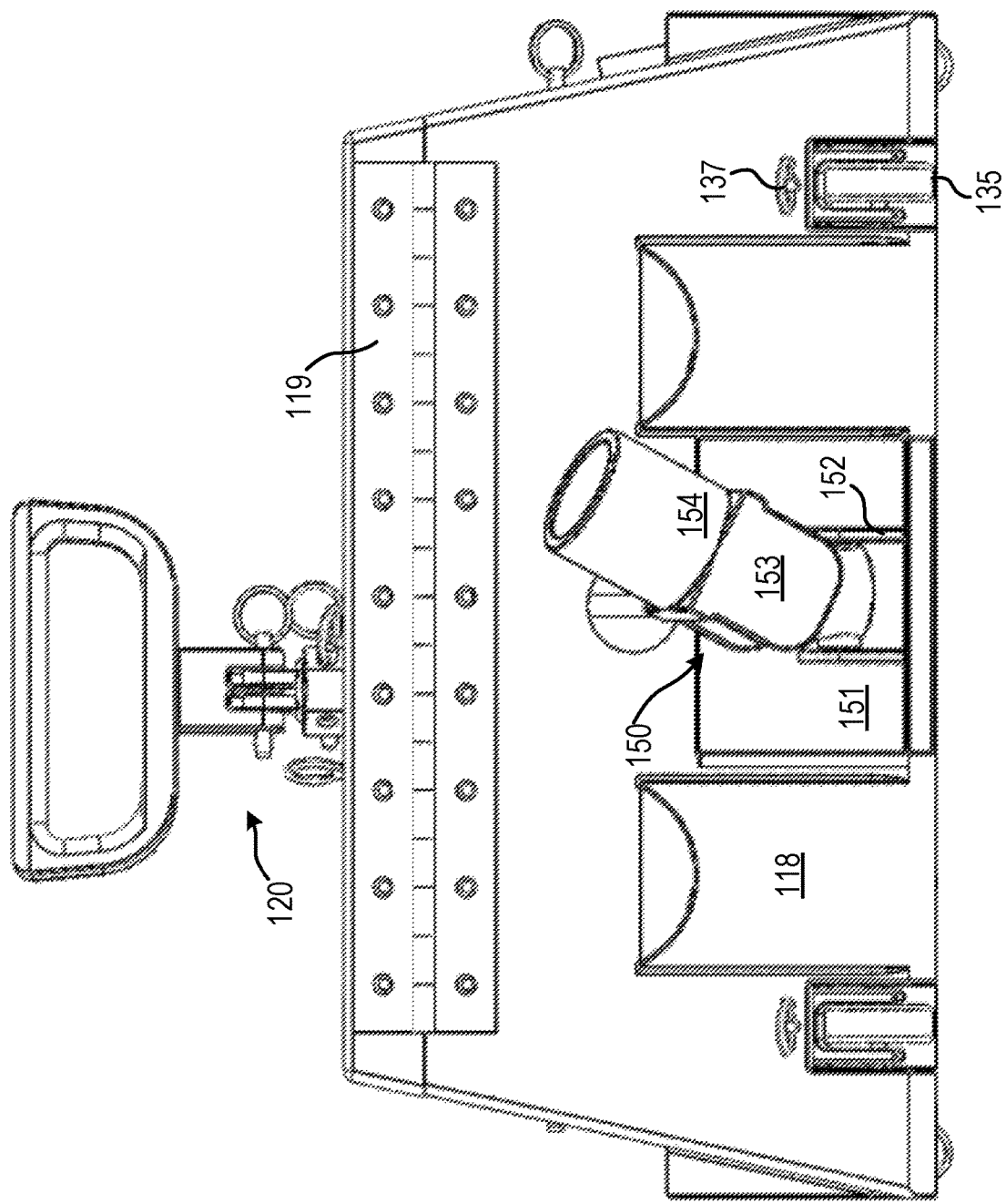
FIG. 5 is a rear elevational view of the system of FIG. 1 to illustrate a sleeve assembly in further detail.
Figure 6:
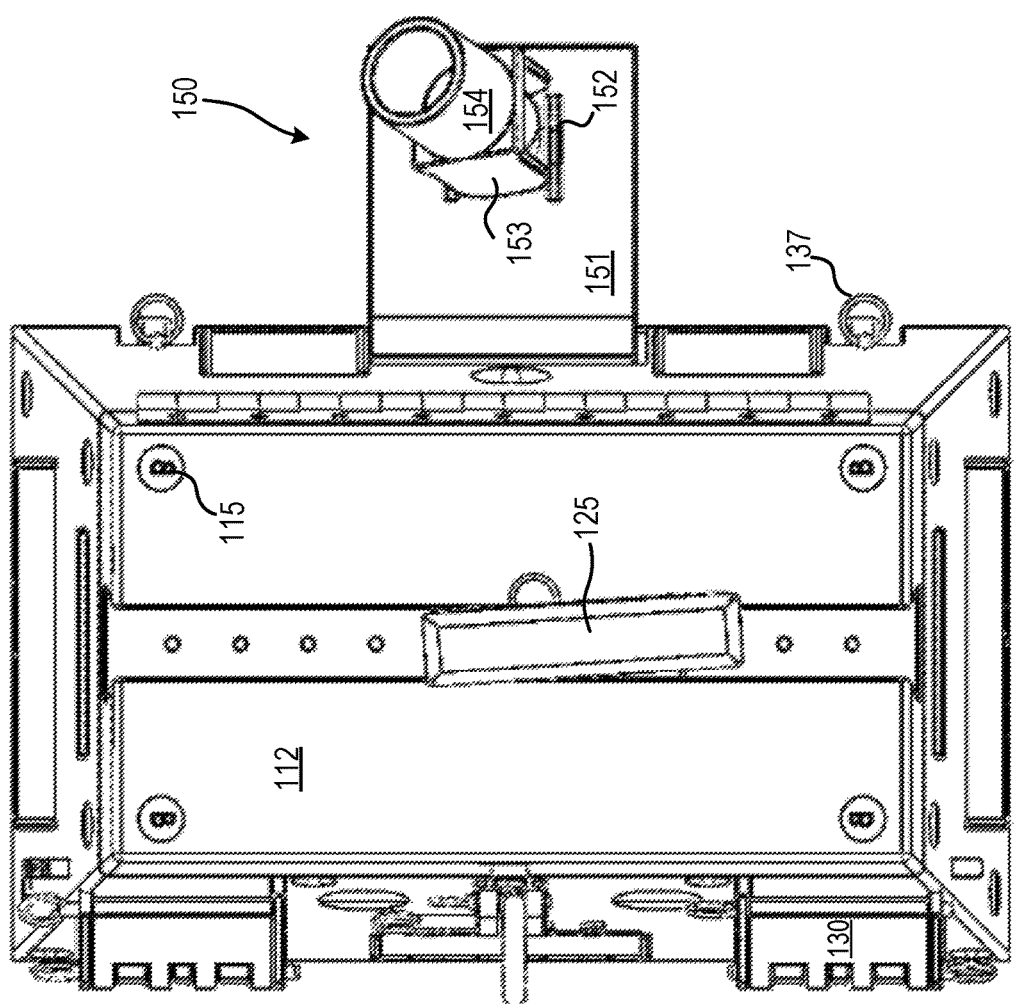
FIG. 6 is a top plan view of the system as shown in FIG. 1 to illustrate the sleeve assembly shown in FIG. 5 in further detail.

With reference to FIGS. 5, 7, and 9, the container 110 of system 100 may further be provided with a pair of retractable wheels 135 secured by suitable fasteners such as release pins 137. Additionally, the bottom surface of container body 111 may have a plurality of corner recessed threaded ports 136 to attach slider pads or discs (not shown) for facilitating movement of the system 100 along the ground (for additional advanced training). Namely, the threaded ports 136 are configured to receive the removable sliding discs (not shown) that will enable the user to push on or pull from system 100, in a similar fashion to push/pull routines done in football where power sleds are used for building strength and endurance. A user can grab the recessed handles 116 to push the container 110 in a sled-like fashion. Another way a user may conduct a push exercise movement against the container 110 is to connect or screw elongate rods into the threaded inserts 115 provided on the lid 112 top surface. Moreover, a user may attach a harness around their body and secure it to the recessed eyelets 117 or posts 145 located at varying positions on container body 111 in order to pull the container 110 of system 100 along the ground. In either mode, system 100 can be weighted in the interior 129 and/or exterior via sleeves 118 to increase or decrease resistance and effort levels. This type of training is commonly used in football, but may also be applicable to other sporting activities where lower body strength and speed are required.

Referring now to FIGS. 5 through 8, system 100 may further include a space 139 on a rear side of the container body 111 for the attachment of a landmine swivel sleeve assembly 150. The landmine swivel sleeve assembly 150 may include a base 151 supporting a bracket 152 which in turn is connected to a swivel 153 supporting a sleeve 154 thereon. The landmine swivel sleeve assembly 150 permits a user to perform "landmine" exercises. These are movements where an Olympic weight lifting bar or similar weight bar is inserted into the sleeve 154 for performing angular and rotational movements, where the user holds the unanchored and opposite end of the weight lifting bar. The user can then perform numerous strength or endurance training exercises of varying difficulty. Additional weighted plates can be loaded on the opposite ends of the bar for additional resistance, so as to achieve a complete body workout. Exercises using the landmine swivel sleeve assembly 150 include but are not limited to squats, presses, dead lifts, rows, and a variety of explosive movement exercises typically employed in advanced training. Landmine exercises and variations thereof are considered advanced exercises, and may provide significant benefits in both weight and endurance training sessions, particularly at intermediate and advanced levels of fitness training.

The storage container 110 with sleeves 118, handle assembly 120/120'/160, footplates 130, and landmine swivel sleeve assembly 150, along with components thereof, may be formed by an injection molding process from a high impact plastic, such as a high-density polyethylene, acrylonitrile butadiene styrene (ABS), a thermoplastic elastomer (TPE), or any another durable plastic, resin-like, or composite material which provides the durability and quality for use to withstand a variety of temperatures and conditions indoors and out of doors. TPE, sometimes referred to as thermoplastic rubbers, are a class of copolymers or a physical mix of polymers (usually a plastic and a rubber) which consist of materials with both thermoplastic and elastomeric properties. While most elastomers are thermosets, thermoplastics are in contrast relatively easy to use in manufacturing, for example, by injection molding. TPEs show advantages typical of both rubbery materials and plastic materials.

ABS is an easily machined, tough, low cost rigid thermoplastic material with high impact strength, and may be a desirable material for turning, drilling, milling, sawing, die-cutting, shearing, etc. Virgin ABS may be mixed with a plastic regrind of ABS or another lightweight, durable plastic material. ABS is merely an example material, equivalent materials may include various thermoplastic and thermoset materials, such as talc-filled polypropylene, high strength polycarbonates such as GE Lexan®, or blended plastics.

There are many known injection molding machines for forming plastic injection molds, other plastic molding processes such as vacuum forming may be used. Alternatively, various components making up the system 100 may be formed using a metal casting process such as sand casting, die casting, or investment casting, for example.

Figure 10:
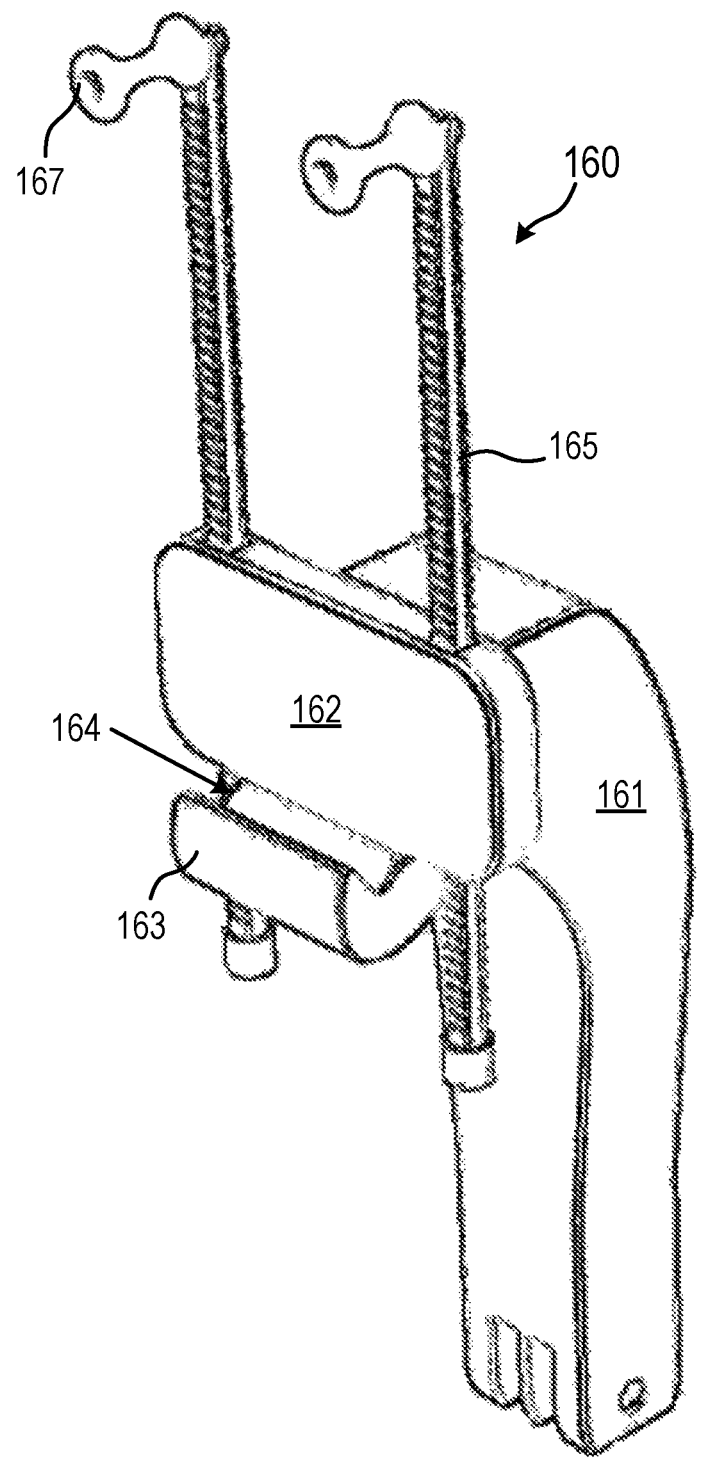
FIG. 10 is an enlarged view of the handle assembly of FIG. 9 to show additional details thereof.

Referring now to FIGS. 9 and 10, there is shown another handle assembly 160 configured with additional functionality as a holder to support one or more smart electronic devices thereon, such as smartphones 180 or tablets. Handle assembly 160 includes an extension arm 161 which is inserted into the trolley 122 slidable within the grooved channel 113 of lid 112 and securable by fasteners such as release pins 127. At an upper end of extension arm 161 there is provided a device holder. The device holder consists of a backing 162, a platform shelf 163 (i.e., a curved shelf with a groove 164 formed between the curled front end of the shelf 163 and backing 162). The bottom end or side edge of a smartphone 180 would rest in the groove 164 of shelf 163. Handle assembly 160 further includes a pair of sliding notched height adjustment elements 165 to adjust for phone or tablet size. A positioning grip 167 is provided at the top end of each height adjustment element 165 to secure the top end or opposite side edge of the smartphone 180 or other smart electronic device in place within handle assembly 160.

Figure 13:
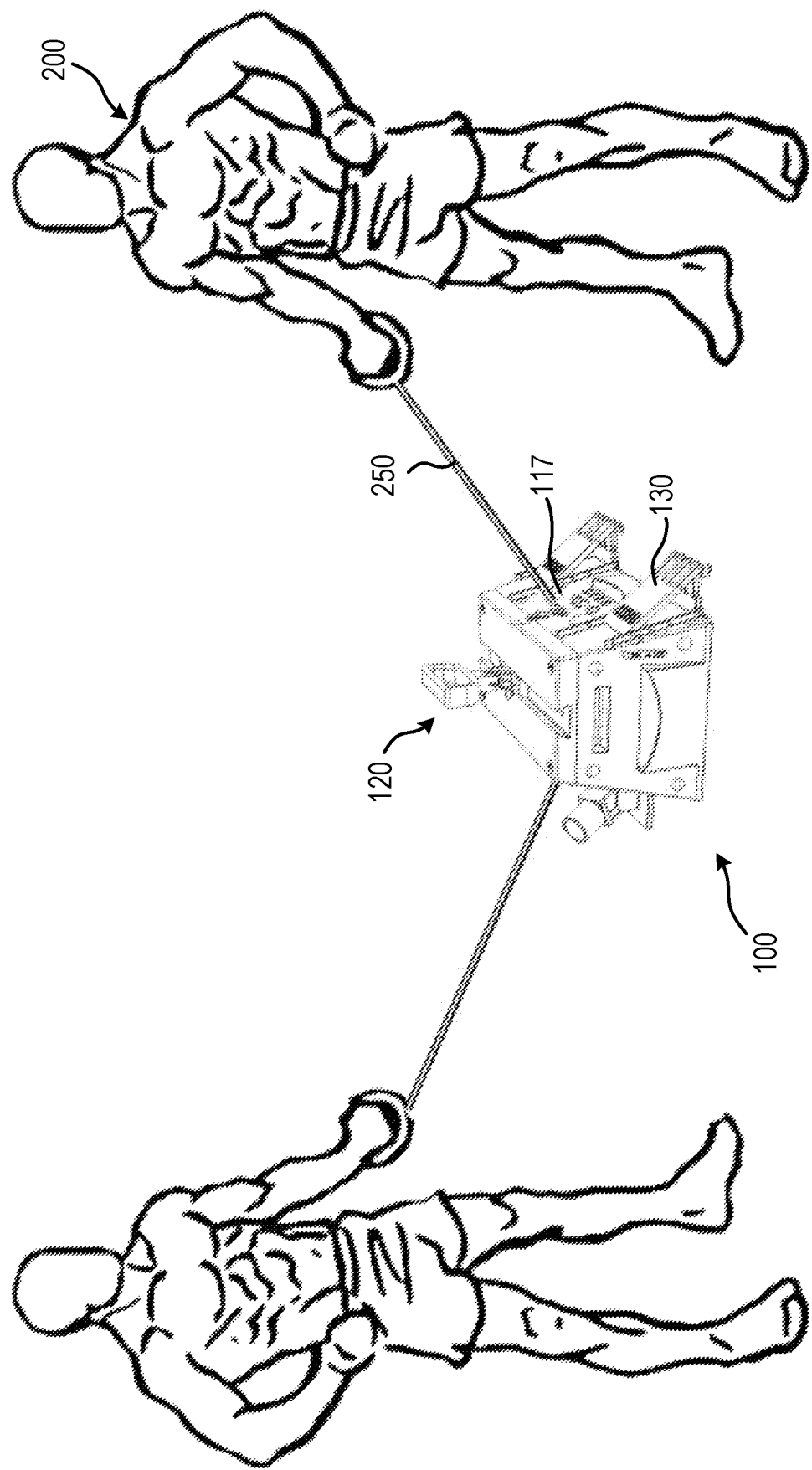
FIG. 13 is an illustration showing an example resistance band-based exercise by a user with the system shown in FIG. 1.

FIG. 13 is an illustration showing an example resistance band-based exercise by a user with the system shown in FIG. 1. As shown in FIG. 13, the system 100 is being used by a pair of users 200. Namely, resistance bands 250 are attached and secured to the recessed eyelets 117, enabling each user 200 to perform multiple strength training, stretching, and/or endurance type exercises. Although not shown in FIG. 13, the system 100 would be weighted within its interior 129 (such as by weights/kettlebells 193 or other articles of the users 200 n placed inside storage container 110) and/or by placing weight in outer sleeves 118. The weight provides stabilization so users 200 can perform multiple exercises in a secure and stable position.

Figure 14:
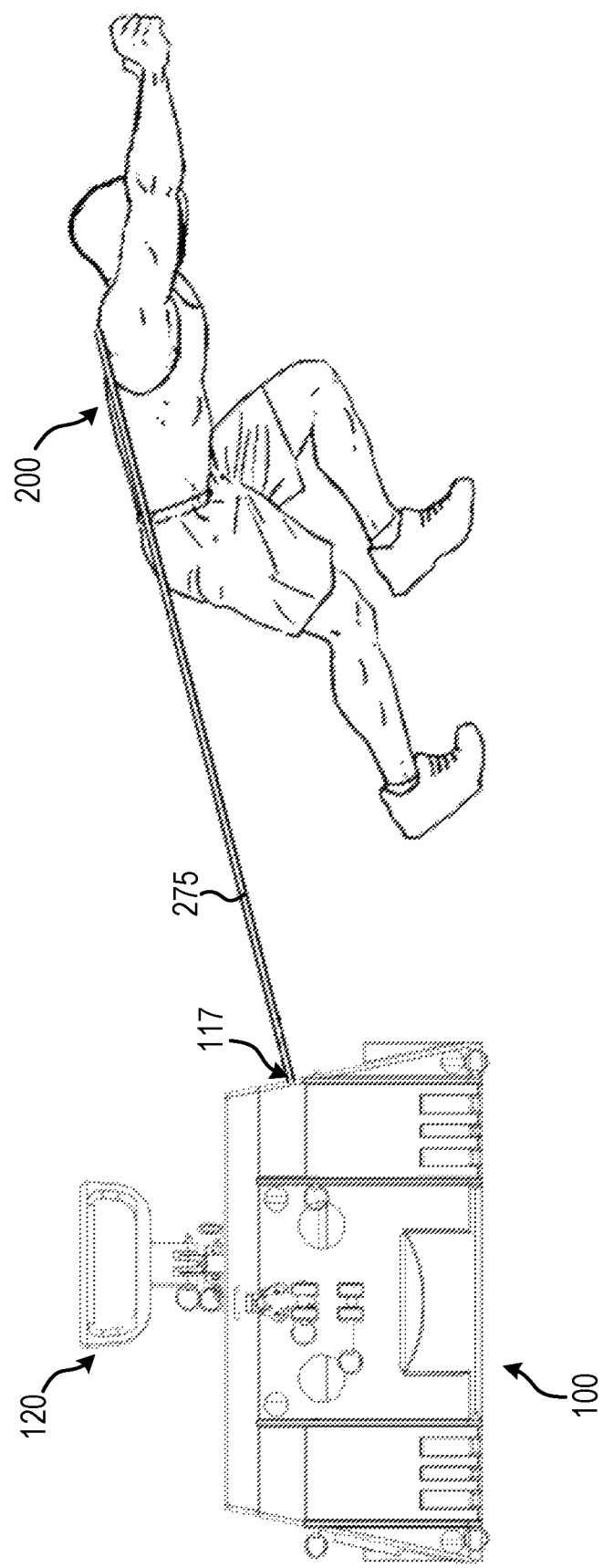
FIG. 14 is an illustration showing an example towing rope-based exercise by a user with the system shown in FIG. 1.

FIG. 14 is an illustration showing an example towing rope-based exercise by a user with the system shown in FIG. 1. Here, the user 200 is conducting a pulling action relative to system 100 by wearing a strap-like device around their body, the opposite end being attached to one or more of the recessed eyelets 117. This is an example of an endurance-type pulling or towing exercise often used in the sport of football or other sports, where lower-body strength and speed are paramount. Similar to as shown in FIG. 13, the system 100 would be weighted via sleeves 118 or within its interior 129.

More particularly with regard to the example exercise setups in FIGS. 13 and 14, a user 200 of system 100 is able to perform both pushing exercises or movement against the storage container 110 of system 100, or pulling exercises from system 100 without toppling or turning over the storage container 110. Namely, the construction and structure of the various interrelated components in system 100 provide a leveraging moment against the user 200, whether or not the user 200 is pushing on or pulling away from system 100. The structure of the various interrelated components in system 100 also permit the user 200 to put their entire weight thereon.

The example embodiments having been described, alternatives may be presented so that one or more of the multi-functional system, fitness station, and/or storage container may be altered in many different ways. In one example, two or more separate multi-functional systems, fitness stations, and/or storage containers may be linked together by a detachable cover that bridges adjacent pairs, so as to realize a contiguous platform for use as a weight bench. In this arrangement the user can lie flat on the securely connected systems/stations/containers in order to conduct a variety of exercises, examples being any of abdominal exercises, dumbbell or barbell chest presses, stretching routines, or virtually any other exercise regimen normally performed on a weight bench.

In yet another alternative example, the container body 111 may be constructed in a circular, disc-like shape and weighted at varying levels, e.g. 50 lbs., 60 lbs., or more for use in advanced circuit training. In this configuration, ports containing an alternating series of landmine sleeves and fitness rope attachments or other similar configurations would be arranged around the outer circumference of container body 111. This could permit multiple users to conduct circuit training by alternating exercises, i.e., rotating periodically from a landmine exercise to a rope exercise with the disc-shaped container body 111 positioned on a floor surface. Offering this type of strength/endurance training would in advanced fitness environments could provide significant challenges to the exerciser in an effort to achieve the highest levels of fitness and athletic performance.

In a non-portable variant configured for use with larger fitness facilities, resistance bands may be replaced by a cable-pulley system, and two or more separate multi-functional systems, fitness stations, and/or storage containers, collectively "devices" would be arranged in a modular fashion as modular devices, such as against a wall. Several modular devices could then be linked together, each having a separate cable-pulley configuration. This arrangement would enable different exercises to be performed. For example, a first modular device could be configured for a bicep curl, a second for a chest press, a third for a triceps extension, a fourth for a pectoral fly, a fifth for an overhead press, etc.

In this alternative example, each individual modular device could further be linked via a computing device to a separate module with an input means such as a touch screen or terminal with display, whereby a user would register and have their information stored in a database. The computer device memory could be configured to contain pre-programmed resistance levels, sets and repetitions personalized to that registrant. The registrant/user would then proceed to the first modular device, execute the exercises, and receive real-time or near real-time visual or audible feedback on their performance, and proceed to subsequent modular devices with similar feedback. In the event the computing device is programmed according to Artificial Intelligence (AI) technologies and/or processes, the computing device based on the user feedback would adjust one or more of resistance levels, exercise time periods, and exercise sequences to facilitate the user's progress, while simultaneously keeping track of the registrant/user's goals and workout history.

This intelligent alternative embodiment offers numerous potential advantages over most conventional, large fitness centers, where although the exercise machines are typically arranged in a variety of upper and lower body configurations, there is no mechanism to measure performance other than an exerciser on the machine manually keeping track of their progressions and results. Moreover, a modular based system of multi-functional devices as described herein use significantly less space than traditional strength training machines, while providing near instantaneous adjustments based on user feedback to provide the user an enhanced, more scientific approach to building muscle and/or endurance. The example system is adaptable to train individual muscle groups or to provide strength/endurance-type circuit training.

Accordingly, the multi-functional system, storage container and/or fitness station design as described above facilitates ease of use by any of beginner, intermediate, and advanced/professional users, in all age groups. The utility, portability, and structural integrity of the example multi-functional system, storage container and/or fitness station make it effective for use in any size fitness facility, as well as for mobile fitness trainers, physical therapists, schools, retirement facilities, martial arts studios, hospitals, country clubs, performance gyms, and the like.

The present invention, in its various embodiments, configurations, and aspects, includes components, systems and/or apparatuses substantially as depicted and described herein, including various embodiments, sub-combinations, and subsets thereof. Those of skill in the art will understand how to make and use the present invention after understanding the present disclosure. The present invention, in its various embodiments, configurations, and aspects, includes providing devices in the absence of items not depicted and/or described herein or in various embodiments, configurations, or aspects hereof, including in the absence of such items as may have been used in previous devices, e.g., for improving performance, achieving ease and\or reducing cost of implementation.

The foregoing discussion of the example embodiments have been presented for purposes of illustration and description. The foregoing is not intended to limit the invention to the form or forms disclosed herein. In the foregoing Detailed Description for example, various features of the invention may be grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

We claim:

1. A multi-functional storage container and fitness training system, comprising:
    a container body with an interior for storing contents therein, multiple exterior side surfaces of the container body including one or more points of attachment for connecting various fitness devices thereto,
    a pivotable lid for securing the contents therein, a top surface of the lid including multiple points of attachment to connect a fitness device thereto,
    one or more removable handle assemblies configured so as to extend upward from a central area of the lid top surface,
    a pair of articulating footplates in spaced relation to one another and attached to a surface of the container body, and
    a slidable central plate arranged between the footplates, wherein in a deployed state the footplates and central plate provide stabilization for the system on a floor or other planar surface during exercise.

2. The system of claim 1, wherein the one or more removable handle assemblies is embodied as fixed length handle assembly with a rotatable handle that may be grasped by a user to enable the user to lift the container in the course of performing various weight training and endurance exercises.

3. The system of claim 2, wherein
the lid top surface has a recessed channel formed centrally across a width-wise portion thereof, and
the fixed length handle assembly further includes:
a base attached to a trolley that is slidable within the recessed channel,
a stem attached to the base, and
a handle attached to the stem.

4. The system of claim 1, wherein the one or more removable handle assemblies is embodied as a handle assembly providing additional functionality as a holder of smart electronic devices.

5. The system of claim 4, wherein the handle assembly providing additional functionality as a holder further includes:
an extension arm attached to a trolley slidable within a grooved channel provided across a top surface of the lid, and
a device holder attached at an upper end of the extension arm, the device holder further comprising:
a backing,
a platform shelf extending forward of the backing and having a groove formed between a front end of the platform shelf and the backing, the groove adapted to receive a bottom end or a side edge of a smart electronic device, and
a pair of sliding notched height adjustment elements to adjust for device size, an upper end of each adjustment element terminating in a positioning grip to secure a top end or opposite side edge of the smart electronic device.

6. The system of claim 1, further comprising a charging port arranged on a surface of the container body for charging smart electronic devices in operative electrical communication therewith.

7. The system of claim 1, wherein the multiple points of attachment is selected from the group consisting of:
a plurality of recessed eyelets formed in various side and top surfaces of the container body for fitness device attachment thereto,
one or more hooks or rings arranged on various surfaces of the container body for attachment of rope ends thereto, and
a plurality of threaded inserts formed at corners of the lid to serve as attachment points for connecting a boxing heavy bag thereto so as to enable a user to perform boxing movements, martial arts punches and kicks.

8. The system of claim 1, wherein the container is embodied as one of a storage container and an insulated cooler.

9. The system of claim 1, wherein the interior of the container body is configured so as to receive one or more of exercise weights, personal articles, and food and beverage items therein.

10. The system of claim 1, further comprising one or more external sleeve pockets attached to the multiple external side surfaces of the container body, wherein the system is further adapted to have a user add weighted object in one of both of the interior and sleeve pockets to serve as stabilization during exercise as well as providing a leveraging moment or counter tension against a user performing a pushing action on the container or applying a pulling force on the container during exercise.

11. The system of claim 1, wherein in a stowed configuration, each footplate is centrally hinged to fold up flush to a front surface of the container body.

12. The system of claim 1, wherein each footplate is slidable within a recessed channel formed in the underside of the container body between stowed and the deployed states.

13. The system of claim 1, further comprising a panel of horizontally arranged slots in spaced relation one above another that are formed on one of the multiple exterior side surfaces of the container body above each footplate, each footplate bisected by a central hinge such that a first distal portion thereof is configured to pivot relative to a second proximal portion of the footplate, and
wherein with the footplates in the deployed state, the slots serve as a footplate holder, enabling adjustment in an angle of articulation of the first hinged distal portion of each footplate relative to the container body via insertion of an edge end of the first distal portion into a desired slot.

14. The system of claim 1, wherein the one or more removable handle assemblies is embodied as an adjustable length handle assembly extendible to facilitate movement or stowage of the container.

15. The system of claim 1, further comprising a pair of retractable wheels provided at a lower end of the container body to facilitate movement of the system for stowage and transport.

16. A storage container having multi-functional utility beyond the storage of articles, comprising:
a container body having an interior adapted to receive exercise and weight components therein as well as to store food, beverage, and personal article items, with multiple exterior side surfaces of the container body including one or more points of attachment for connecting various fitness devices thereto,
a pivotable lid for securing the contents therein, a top surface of the lid including multiple points of attachment to connect a fitness device thereto,
a rotatable handle configured so as to extend upward from a central area of the lid top surface, the handle enabling a user to lift the storage container in the course of performing various weight training and endurance exercises, and
a swivel sleeve assembly attached to one of the multiple exterior side surfaces of the container body to facilitate the user performing exercise movements where a weight lifting bar is inserted into the swivel sleeve assembly for performing angular and rotational movements.

\* \* \* \* \*